US012739661B2

(12) United States Patent
Li

(10) Patent No.: US 12,739,661 B2
(45) Date of Patent: Sep. 15, 2026

(54) CONTROL RESOURCE SET POOL INDEX UPDATING METHOD AND APPARATUS, TERMINAL, AND NETWORK DEVICE

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 531 days.

(21) Appl. No.: 18/024,749

(22) PCT Filed: Sep. 7, 2020

(86) PCT No.: PCT/CN2020/113806
§ 371 (c)(1),
(2) Date: Mar. 6, 2023

(87) PCT Pub. No.: WO2022/047792
PCT Pub. Date: Mar. 10, 2022

(65) Prior Publication Data

US 2023/0345260 A1 Oct. 26, 2023

(51) Int. Cl.
*H04W 16/28* (2009.01)
*H04W 72/1268* (2023.01)
(Continued)

(52) U.S. Cl.
CPC ....... *H04W 16/28* (2013.01); *H04W 72/1268* (2013.01); *H04W 72/21* (2023.01); *H04W 74/0833* (2013.01); *H04W 74/0836* (2024.01)

(58) Field of Classification Search
None
See application file for complete search history.

(56) References Cited

U.S. PATENT DOCUMENTS

2019/0334687 A1 10/2019 Su et al.
2021/0376909 A1* 12/2021 Khoshnevisan ...... H04W 76/19
(Continued)

FOREIGN PATENT DOCUMENTS

CN 110167203 A 8/2019
CN 111447636 A 7/2020
(Continued)

OTHER PUBLICATIONS

U.S. Appl. No. 63/042,473, filed Jun. 22, 2020 to Deghel et al., "Transmission Reception Point-Specific Beam Failure Indications in Multi-Transmission Reception Point Scenarios", p. 1-25 and figures 1-7.*

(Continued)

*Primary Examiner* — Gregory B Sefcheck
(74) *Attorney, Agent, or Firm* — Arch & Lake LLP

(57) ABSTRACT

A method is provided to update control resource set pool index. The method includes: sending a beam failure indication to a network device on a channel resource of a first TRP, the beam failure indication being used to inform the network device of a beam failure occurred at a second TRP, the second TRP being a default TRP before the beam failure occurs, and the first TRP and the second TRP belonging to a same physical cell; receiving an update indication sent by the network device on the channel resource of the first TRP based on the beam failure indication; and in response to the update indication, updating a control resource set pool index (CORESETpoolindex) of a control resource set (CORESET) corresponding to the first TRP.

17 Claims, 4 Drawing Sheets

101: A terminal sends a beam failure indication to a network device via a channel resource of a first TRP 102: The terminal receives an update indication sent by the network device via the channel resource of the first TRP based on the beam failure indication 103: In response to the update indication, the terminal updates a control resource set pool index of a control resource set corresponding to the first TRP

(51) Int. Cl.

| | |
|---|---|
| ***H04W 72/21*** | (2023.01) |
| ***H04W 74/0833*** | (2024.01) |
| ***H04W 74/0836*** | (2024.01) |

(56) References Cited

U.S. PATENT DOCUMENTS

| | | | | |
|---|---|---|---|---|
| 2021/0399784 | A1* | 12/2021 | Deghel | H04W 80/02 |
| 2022/0225135 | A1* | 7/2022 | Cirik | H04L 5/0053 |
| 2022/0302989 | A1* | 9/2022 | Zhang | H04W 76/19 |
| 2022/0337363 | A1* | 10/2022 | Guo | H04L 5/0053 |
| 2023/0081293 | A1* | 3/2023 | Li | H04W 72/23<br>370/329 |
| 2023/0156845 | A1* | 5/2023 | Khoshnevisan | H04L 5/0023<br>370/216 |
| 2023/0198602 | A1* | 6/2023 | Zeineddine | H04W 76/19<br>370/329 |
| 2023/0199529 | A1* | 6/2023 | Koskela | H04L 5/0091<br>370/216 |
| 2023/0300645 | A1* | 9/2023 | Kwak | H04L 5/0091<br>370/242 |
| 2024/0187200 | A1* | 6/2024 | Zhou | H04L 5/0053 |
| 2024/0235790 | A1* | 7/2024 | Cirik | H04W 72/1273 |
| 2024/0333467 | A1* | 10/2024 | Khoshnevisan | H04L 5/14 |
| 2024/0397472 | A1* | 11/2024 | Li | G01S 5/0009 |

FOREIGN PATENT DOCUMENTS

| | | | |
|---|---|---|---|
| CN | 111479326 | A | 7/2020 |
| WO | 2020010630 | A1 | 1/2020 |
| WO | 2020015545 | A1 | 1/2020 |
| WO | 2020151472 | A1 | 7/2020 |
| WO | 2020166024 | A1 | 8/2020 |

OTHER PUBLICATIONS

International Search Report of PCT/CN2020/113806 dated May 26, 2021 with English translation, (4p).

First Office Action issued in Chinese Application No. 202080002292.6 dated Nov. 18, 2022 with English translation (11p.).

Lenovo, et al., "Enhancements on beam management for multi-TRP", 3GPP TSG RAN WG1#102-3, R1-2005823, e-Meeting, Aug. 17-28, 2020, (4p).

* cited by examiner 700
processor
701
transmitter
703
705
bus
702
704
receiver
memory 800
801
803
802
processor
transmitter
receiver
bus
8041
operating system
804
8042
application
program module
memory

CONTROL RESOURCE SET POOL INDEX UPDATING METHOD AND APPARATUS, TERMINAL, AND NETWORK DEVICE

CROSS-REFERENCE

The present application is a U.S. National Stage of International Application No. PCT/CN2020/113806, filed on Sep. 7, 2020, the contents of which are incorporated herein by reference in their entireties for all purposes.

BACKGROUND

In the 5G New Radio (NR) system, especially when a communication band is in frequency range 2 (frequency range 2), due to a fast attenuation of the high frequency channel, in order to ensure the coverage, there is a need to use beam for signal transmission and reception.

When the network device has multiple transmission reception points (TRPs), the network device may use multiple TRPs to provide services for a terminal. The network devices may configure different control resource sets (CORESETs) for the terminal. Each CORESET is configured with a CORESETPoolindex. A different CORESETPoolindex corresponds to a different TRP, and the same CORESETPoolindex corresponds to the same TRP.

For example, CORESETpoolindex #0 correspondingly contains CORESET #0, CORESET #1 and CORESET #2, and CORESET #0, CORESET #1 and CORESET #2 may be used for the physical downlink control channel (PDCCH) transmission of TRP #0. CORESETpoolindex #1 correspondingly contains CORESET #3 and CORESET #4, and CORESET #3 and CORESET #4 may be used for the PDCCH transmission of TRP #1. That is, the CORESETpoolindexs of multiple CORESETs for the PDCCH transmission of the same TRP are the same, and the CORESETpoolindexs of the CORESETs for the PDCCH transmission of different TRPs are different.

SUMMARY

The present disclosure relates to the field of communication technology, in particular to a control resource set pool index updating method, apparatus, terminal and network device. Embodiments of the present disclosure provide a control resource set pool index updating method, apparatus, terminal and network device, and can realize an update of the control resource set pool index. The technical schemes are as follows.

According to an aspect of the embodiments of the present disclosure, a control resource set pool index updating method is provided, and the method includes:

- sending a beam failure indication to a network device on a channel resource of a first TRP, the beam failure indication being used to inform the network device of a beam failure occurred at a second TRP, the second TRP being a default TRP before the beam failure occurs, and the first TRP and the second TRP belonging to a same physical cell;
- receiving an update indication sent by the network device on the channel resource of the first TRP based on the beam failure indication; and
- in response to the update indication, updating a control resource set pool index of a control resource set corresponding to the first TRP.

According to an aspect of the embodiments of the present disclosure, a control resource set pool index updating method is provided, and the method includes:

- receiving a beam failure indication sent by a terminal to a network device on a channel resource of a first TRP, the beam failure indication being used to inform the network device of a beam failure occurred at a second TRP, the second TRP being a default TRP before the beam failure occurs, and the first TRP and the second TRP belonging to a same physical cell; and
- in response to the beam failure indication, sending an update indication to the terminal on the channel resource of the first TRP, the update indication being used to indicate the terminal to update a control resource set pool index of a control resource set corresponding to the first TRP.

According to another aspect of the embodiments of the present disclosure, a terminal is provided, and the terminal includes: a processor; and a memory, configured to store executable instructions executable by the processor; and the processor is configured to load and execute the executable instructions to implement the aforementioned control resource set pool index updating method.

According to another aspect of the embodiments of the present disclosure, a network device is provided, and the network device includes: a processor; and a memory, configured to store executable instructions executable by the processor; and the processor is configured to load and execute the executable instructions to implement the aforementioned control resource set pool index updating method.

According to another aspect of the embodiments of the present disclosure, a computer-readable storage medium is provided, and instructions in the computer-readable storage medium, when executed by a processor, implement the aforementioned control resource set pool index updating method.

It should be understood that the above general description and the following detailed description are only examples and explanatory, and do not limit the present disclosure.

BRIEF DESCRIPTION OF THE DRAWINGS

The drawings herein are incorporated into the specification and form a part of the specification, showing embodiments in conformity with the present disclosure, and are used together with the specification to explain the principles of the present disclosure.

DETAILED DESCRIPTION

Figure 1:
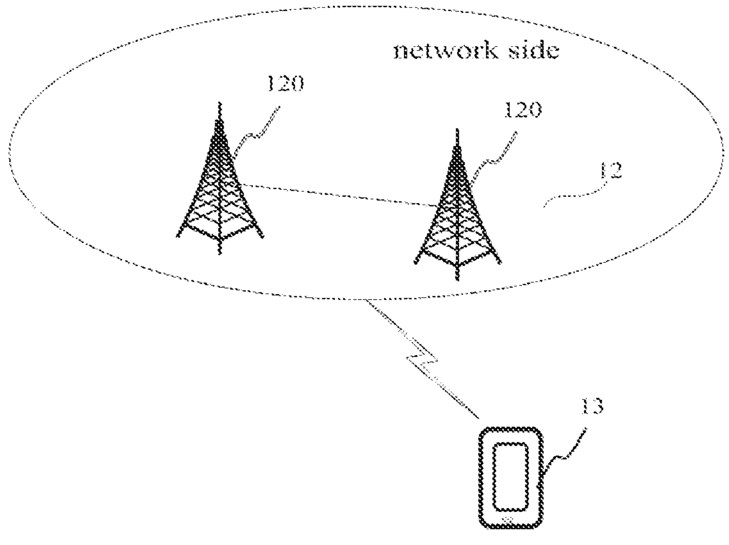
FIG. 1 shows a block diagram of a communication system provided by a schematic embodiment of the present disclosure.

Embodiments will be described herein in detail, examples of which are represented in the drawings. Where the following description relates to the drawings, the same numerals in different drawings indicate the same or similar elements unless otherwise indicated. The embodiments described in the following embodiments do not represent all embodiments consistent with the present disclosure. Rather, they are only examples of apparatus and methods consistent with some aspects of the present disclosure, as detailed in the appended claims.

The terms used in the embodiments of the present disclosure are only for the purpose of describing specific embodiments, and are not intended to limit the embodiments of the present disclosure. The "a" and "the" in the singular form used in the embodiments of the present disclosure and the appended claims are also intended to include multiple forms, unless the context clearly indicates other meanings. It should also be understood that the term "and/or" used herein refers to and includes any or all possible combinations of one or more associated listed items.

It should be understood that although the terms of first, second, third and the like may be used to describe various information in the embodiments of the present disclosure, such information should not be limited to these terms. These terms are only used to distinguish the information of the same type from each other. For example, without departing from the scope of the embodiments of the present disclosure, the first information may also be called the second information, similarly, the second information may also be called the first information. Depending on the context, the words "if" and "in case of" used herein may be interpreted as "when" or "at the time of" or "in response to determination of".

It should be understood that although the steps are described in the way of numbering for the convenience of understanding in the embodiments of the present disclosure, the numbering does not represent the order in which the steps are performed, nor does it mean that the sequentially numbered steps must be performed together. It should be understood that one or more of the sequentially numbered steps may be performed individually to solve the corresponding technical problem and reach the predetermined technical schemes. Even the multiple steps that are listed together in the drawings for example do not mean that these steps must be performed together. The drawings are just illustrative listing of these steps for ease of understanding.

FIG. 1 shows a block diagram of a communication system provided by a schematic embodiment of the present disclosure. As shown in FIG. 1, the communication system may include a network side 12 and a terminal 13.

The network side 12 includes a number of network devices 120. The network device 120 may be a base station, and the base station is a device deployed in an access network to provide wireless communication functions for a terminal. The base station may be either a base station of a service cell of the terminal 13 or a base station of a cell adjacent to the service cell of the terminal 13. The base station may include various forms of macro base stations, micro base stations, relay stations, access points, transmission reception points (TRPs), and the like. In systems using different radio access technologies, the names of the devices with the base station function may vary. In 5G New Radio (NR) systems, the name of the devices with the base station function is called gNodeB or gNB. The name "base station" may change as communication technologies evolve. The network device 120 may also be a location management function (LMF) entity. In the vehicle networking communication, the network device 120 may also be a vehicle-mounted terminal device.

The terminal 13 may include various devices with wireless communication functions, such as handheld devices, vehicle-mounted devices, wearable devices, computing devices or other processing devices connected to wireless modems, as well as various forms of user devices, mobile stations (MS), terminals, internet of things (IoT), industry internet of things (IIoT), and so on. For the convenience of description, the above-mentioned devices are collectively referred to as terminals. The network device 120 and the terminal 13 communicate with each other through some air interface technology, such as a Uu interface.

In the current standard, a beam failure recovery process for a primary cell (PCell) or a primary and secondary cell (PScell) is defined as follows:

when a terminal detects that all the radio link quality corresponding to the reference signal in q0 is lower than a threshold value, a beam failure occurs at the Pcell/PScell is determined, and the cell is PCell/PSCell; when the terminal detects the beam failure occurs at the PCell/PSCell, then the beam corresponding to the reference signal in q1 is detected, and whether there is a L1-reference signal receiving power (RSRP) or a L1-signal to interference plus noise ratio (SINR) of the beam greater than the threshold value is determined. If yes, the beam corresponding to the reference signal is considered as a candidate beam, and a random access preamble is sent on a random access resource to conduct random access and realize beam recovery, the random access resource is corresponding to a synchronization signal block (SSB) and the synchronization signal block is corresponding to the reference signal. Herein, q0 refers to a set of reference signals used to detect the beam failure, and q1 refers to a set of reference signals corresponding to the candidate beam.

The Pcell/PScell of the terminal is configured with more than one TRP. For example, the Pcell is configured with two TRPs, TRP #0 and TRP #1. The CORESETpoolindex configured for the CORESETs corresponding to TRP #0 is 0, including CORESET #0, CORESET #1 and CORESET #2; The CORESETpoolindex of the CORESETs corresponding to TRP #1 is 1, including CORESET #3 and CORESET #4. When the terminal detects the beam failure, it is determined that the beam failure occurs at all TRPs of Pcell/PScell. However, the fact may be that the beam failure occurs at TRP #0, but no beam failure occurs at TRP #1, and the candidate beam is at TRP #1. When the candidate beam is used for random access, that is, CORESET #0 is to be switched to TRP #1, and the CORESETPoolindex corresponding to CORESET #0 is 0 by default, while the CORESETPoolindex corresponding to the original CORESET #3 and CORESET #4 of TRP #1 is 1, resulting in an inconsistency of the CORESETPoolindexs corresponding to the CORESETs of the same TRP, and thus resulting in that the CORESETPoolindexs configured for the CORESETs cannot distinguish the TRPs.

The communication system and business scenarios described in the embodiments of the present disclosure are intended to illustrate the technical schemes of the embodiments of this disclosure more clearly and do not constitute a limitation of the technical schemes provided by the embodiments of the present disclosure. It is known to those skilled in the art that the technical schemes provided by the embodiments of the present disclosure are equally applicable to similar technical problems as the communication system evolves and new business scenarios emerge.

Figure 2:
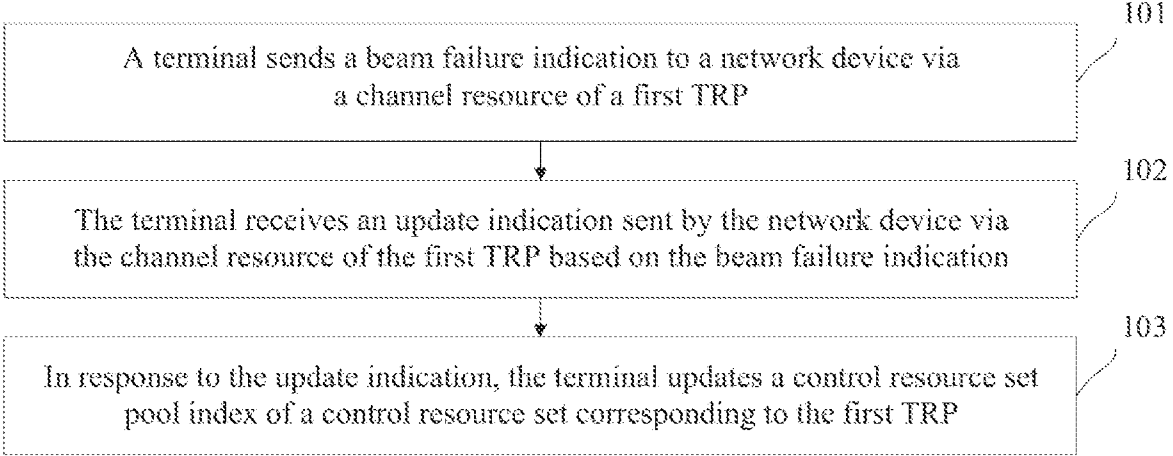
FIG. 2 is a flowchart of a control resource set pool index updating method illustrated according to an embodiment.

FIG. 2 is a flowchart of a control resource set pool index updating method illustrated according to an embodiment. Referring to FIG. 2, the method includes the following steps of 101 to 103.

In the step 101, a terminal sends a beam failure indication to a network device on a channel resource of a first TRP, the beam failure indication being used to inform the network device of a beam failure occurred at a second TRP.

In this embodiment, the second TRP is a default TRP before the beam failure occurs, the default TRP being a TRP corresponding to a control resource set pool index of CORESET #0 of the terminal, i.e., CORESET #0 is a CORESET used by the second TRP to send a PDCCH to the terminal before the beam failure occurs.

In the step 101, the first TRP and the second TRP belong to a same physical cell, because only when they belong to the same physical cell, the CORESET of the first TRP and the CORESET of the second TRP need to be distinguished by the CORESETPoolindex. In addition, if the beam failure occurs at the second TRP, the candidate beam corresponds to the first TRP, and the channel resource of the first TRP is used to send the beam failure indication, an inconsistency of the CORESETPoolindexs corresponding to the CORESETs of the same TRP is caused, and the update method provided by the present disclosure is required.

In the step 102, the terminal receives an update indication sent by the network device on the channel resource of the first TRP based on the beam failure indication.

After receiving the beam failure indication, the network device sends the update indication to the terminal, instructing the terminal to update the CORESETPoolindex.

In the step 103, in response to the update indication, the terminal updates a control resource set pool index of a control resource set corresponding to the first TRP.

Herein, the update indication is used to indicate the terminal to update the control resource set pool index corresponding to a CORESET other than CORESET #0 on the first TRP. Therefore, the update here is not actually to update the CORESETPoolindex of all CORESETs corresponding to the first TRP, but to update the CORESETPoolindex of a CORESET other than CORESET #0, such as the aforementioned CORESET #3 and CORESET #4. Through the above update, the CORESETPoolindex of all CORESETs corresponding to the first TRP is consistent, such as 0.

In the embodiments of the present disclosure, when a beam failure occurs at a second TRP, a beam failure indication is sent to a network device on a channel resource of a first TRP, and the network device, after receiving the beam failure indication, determines whether to update a control resource set pool index of the terminal, and if so, sends an update indication to the terminal, and the terminal, after receiving the update indication, updates the control resource set pool index of a control resource set corresponding to the first TRP, making the control resource set pool index of all control resource sets of the first TRP the same, ensuring that all control resource sets of the first TRP, when being used, can determine the corresponding TRP based on the control resource set pool index, realizing communication between the terminal and the first TRP, and ensuring correct use of all control resource sets of the first TRP.

When a beam failure occurs, the terminal needs to inform the network device of the beam failure to realize beam recovery. In the embodiments of the present disclosure, there are two ways of sending the beam failure indication.

The first is, sending, by using a random access channel corresponding to a candidate beam, a random access preamble carrying the beam failure indication.

The second is, sending a PUCCH message carrying the beam failure indication.

That is, one is to send the beam failure indication by using the random access preamble in a random access process, the other is to send the beam failure indication through the physical uplink control channel (PUCCH) message.

For example, the sending, by using the random access channel corresponding to the candidate beam, the random access preamble carrying the beam failure indication includes the following sub-steps:

determining a reference signal SSB corresponding to the candidate beam, determining a random access channel resource corresponding to the SSB and a corresponding random access preamble used to indicate the beam failure, and sending the random access preamble on the random access channel resource to inform the network device of the beam failure.

For example, the sending the PUCCH message carrying the beam failure indication includes the following sub-step:

sending, by using a scheduling request (SR), the beam failure indication on a PUCCH resource.

In the embodiments of the present disclosure, the beam failure indication may be represented by a field. When the field is a set value, it indicates that a beam fails to be sent. The beam failure indication may also contain no field, that is, a signal with a certain energy is sent on a specific symbol, and the network device detects the corresponding energy, indicating that the terminal has sent the beam failure indication.

In the embodiments of the present disclosure, the beam failure indication may only indicate the existence of a TRP at which a beam failure occurs, but do not indicate which TRP or TRPs the beam failure occurs at, that is, when the network device receives the beam failure indication, it does not know which TRP or TRPs the beam failure occurs at, i.e., it does not know the identification information of the TRP at which the beam failure occurs.

In one case, the network device sends the update indication without knowing the identification information of the TRP at which the beam failure occurs. As mentioned above, the network device needs to determine whether to send the update indication after receiving the beam failure indication. In this case, the network device may determine, based on the random access preamble carrying the beam failure indication, the TRP at which the candidate beam is located, and judge, according to a comparison between this TRP and the default TRP, whether to send the update indication. If this TRP is the same as the previous default TRP, no update indication may be sent, and if this TRP is different from the previous default TRP, the update indication needs to be sent. For example, when the terminal uses random access of the first TRP to indicate the beam failure, the network device receives the random access preamble indicating the beam failure, then it is determined that the candidate beam is at the first TRP, and if the previous default TRP is not the first TRP, the network device will determine that the update indication needs to be sent.

In another case, after sending the beam failure indication, the terminal further sends a message to inform the network device of the identification information of the TRP at which the beam failure occurs, causing the network device to send the update indication in the case of knowing the identification information of the TRP at which the beam failure occurs. In this case, based on the identification information of the TRP at which the beam failure occurs, the network device determines the TRP at which the beam failure occurs. If the TRP at which the beam failure occurs is different from the previous default TRP, no update indication may be sent, and if the TRP at which the beam failure occurs is the same as the previous default TRP, the update indication needs to be sent. For example, if the beam failure indication is sent by using the PUCCH of the first TRP, and the TRP at which the beam failure occurs is the default TRP, the network device needs to send the update indication.

In still another case, after sending the beam failure indication, the terminal further sends a message to inform the network device of the identification information of the TRP at which the beam failure occurs and the identification information of the candidate beam, causing the network device to send the update indication in the case of knowing the identification information of the TRP at which the beam failure occurs and the identification information of the candidate beam. In this case, the means of determining whether to send the update indication by the network device is the same as the means of determining whether to send the update indication by the network device in the previous case (only inform the network device of the identification information of the TRP at which the beam failure occurs).

For example, after the sending, by using the random access channel corresponding to the candidate beam, the random access preamble carrying the beam failure indication, the method further includes the following steps:

sending, during a four-step random access process, a Msg3 carrying identification information of the second TRP; or, sending, during a two-step random access process, a MsgA carrying identification information of the second TRP.

For example, after the sending the PUCCH message carrying the beam failure indication, the method further includes the following step:

sending, on a PUSCH resource, identification information of the second TRP and/or identification information of a reference signal corresponding to the candidate beam, the PUSCH resource being a PUSCH resource indicated by resource scheduling information sent by the network device based on the SR.

After receiving the scheduling request SR from the terminal, the network device sends an uplink scheduling grant (UL grant) to the terminal and assigns a PUSCH to the terminal. After receiving the UL grant, the terminal uses the PUSCH described above to send the identification information of the second TRP and/or the identification information of the reference signal corresponding to the candidate beam.

Herein, the candidate beam is a beam used for transmission between the first TRP and the terminal.

When the message during a random access process is used for transmission of beam failure indication and subsequent identification information, the network device knows, based on the beam used for transmission of the random access preamble, the candidate beam determined by the terminal. In contrast, when a PUCCH and a PUSCH are used to send beam failure indication and subsequent identification information, the network device does not know the candidate beam, so there is a need to send the identification information of the reference signal corresponding to the candidate beam, thus informing the network device of the candidate beam.

In the embodiments of the present disclosure, the terminal receives the update indication sent by the network device, which may also include the following two cases:

the first is, receiving the update indication sent by the network device on the channel resource of the first TRP during a random access process;

the second is, receiving the update indication sent by the network device on the channel resource of the first TRP after a random access process is completed.

The first, receiving the update indication sent by the network device on the channel resource of the first TRP during the random access process includes the following sub-steps:

during a four-step random access process, receiving a Msg4 carrying the update indication; or during a four-step random access process, receiving a Msg4, the Msg4 being the update indication; or during a two-step random access process, receiving a MsgB carrying the update indication.

In the embodiments of the present disclosure, the update indication may be a field carried in the message during a random access process, or may be the message itself during a random access process. In both cases, the terminal performs different actions after receiving the update indication.

For example, the update indication is written in a Msg4 or MsgB. The in response to the update indication, updating the control resource set pool index of the control resource set corresponding to the first TRP includes the following sub-steps:

determining, based on the update indication, the control resource set pool index of the control resource set corresponding to the first TRP;

updating the control resource set pool index of the control resource set corresponding to the first TRP.

In this case, the update needs to determine how to update the CORESETPoolindex based on the content of the update indication.

For example, the update indication includes the control resource set pool index of the control resource set of the first TRP. In this case, the terminal updates the CORESETpoolindex of each CORESET of the first TRP according to the control resource set pool index of the control resource set indicated in the update indication. For example, the update indication includes the identification of the control resource set of the first TRP and the corresponding control resource set pool index.

Alternatively, the update indication includes an empty field, the empty field being used to indicate the control resource set pool index of the control resource set corresponding to the first TRP being a default index value. In this case, the terminal updates the CORESETpoolindex of each CORESET of the first TRP to the default index value, such as 0.

For another example, the update indication is a Msg4. The in response to the update indication, updating the control resource set pool index of the control resource set corresponding to the first TRP includes the following sub-step:

after a predetermined time starting from receiving of the update indication, updating the control resource set pool index of the control resource set corresponding to the first TRP to a default index value.

Here, the predetermined time may be K symbols, and the value range of K may be 1~100, for example, the predetermined time is 28 symbols.

The second, the receiving the update indication sent by the network device on the channel resource of the first TRP after the random access process is completed includes the following sub-step:

receiving a control resource set pool index configuration signaling or a control resource set configuration signaling carrying the update indication, the control resource set pool index configuration signaling or the control resource set configuration signaling being carried in at least one of a RRC signaling, a MAC CE signaling and a DCI signaling.

In some examples, the method further includes the following step:

configuring a control resource set pool index of a control resource set corresponding to the second TRP.

For example, update the control resource set pool index of the control resource set corresponding to the second TRP to a different value from the control resource set pool index of the control resource set corresponding to the first TRP, such as 1.

It is worth noting that the above steps 101 to 103 and the above alternative steps may be combined in any combination.

Figure 3:
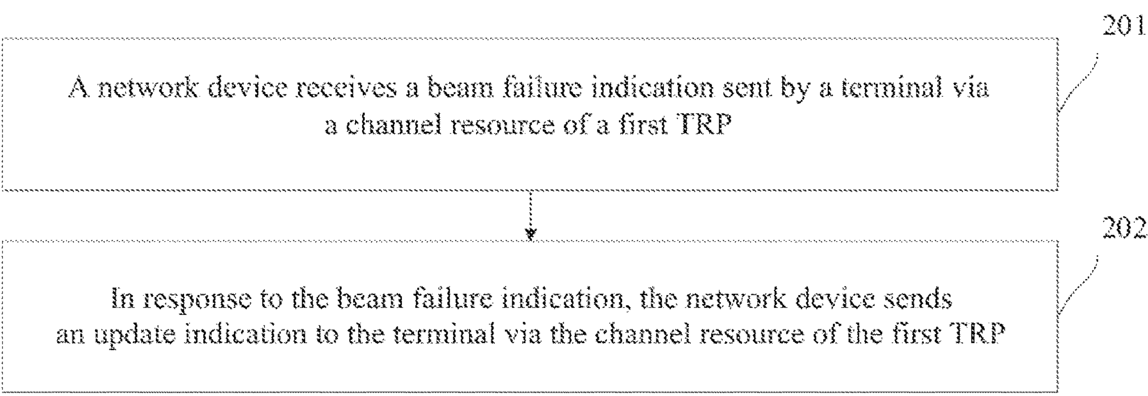
FIG. 3 is a flowchart of a control resource set pool index updating method illustrated according to an embodiment.

FIG. 3 is a flowchart of a control resource set pool index updating method illustrated according to an embodiment. Referring to FIG. 3, the method includes the following steps of 201 to 202.

In the step 201, a network device receives a beam failure indication sent by a terminal on a channel resource of a first TRP.

Herein, the beam failure indication being used to inform the network device of a beam failure occurred at a second TRP, the second TRP being a default TRP before the beam failure occurs, and the first TRP and the second TRP belonging to a same physical cell.

In the step 202, in response to the beam failure indication, the network device sends an update indication to the terminal on the channel resource of the first TRP, the update indication being used to indicate the terminal to update a control resource set pool index of a control resource set corresponding to the first TRP.

In the embodiments of the present disclosure, when a beam failure occurs at a second TRP, a network device receives a beam failure indication sent by a terminal on a channel resource of a first TRP, and the network device, after receiving the beam failure indication, determines whether to update a control resource set pool index of the terminal, and if so, sends an update indication to the terminal, and the terminal, after receiving the update indication, updates the control resource set pool index of a control resource set corresponding to the first TRP, making the control resource set pool index of all control resource sets of the first TRP the same, ensuring that all control resource sets of the first TRP, when being used, can determine the corresponding TRP based on the control resource set pool index, realizing communication between the terminal and the first TRP, and ensuring correct use of all control resource sets of the first TRP.

In some examples, the receiving the beam failure indication sent by the terminal to the first TRP includes the following sub-steps:

receiving a random access preamble carrying the beam failure indication sent by the terminal by using a random access channel corresponding to a candidate beam; or receiving a PUCCH message carrying the beam failure indication and sent by the terminal.

In some examples, after the receiving the random access preamble carrying the beam failure indication sent by the terminal by using the random access channel corresponding to the candidate beam, the method further includes the following sub-steps:

receiving, during a four-step random access process, a Msg3 carrying identification information of the second TRP; or, receiving, during a two-step random access process, a MsgA carrying identification information of the second TRP.

In some examples, the receiving the PUCCH message carrying the beam failure indication and sent by the terminal includes the following sub-step:

receiving the beam failure indication sent by the terminal on a PUCCH resource using a scheduling request SR.

In some examples, after the receiving the PUCCH message carrying the beam failure indication and sent by the terminal, the method further includes the following step:

receiving identification information of the second TRP and/or identification information of a reference signal corresponding to the candidate beam sent by the terminal on a PUSCH resource, the PUSCH resource being a PUSCH resource indicated by resource scheduling information sent by the network device based on the SR.

In some examples, the sending the update indication to the terminal on the channel resource of the first TRP includes the following sub-step:

during a random access process, sending the update indication to the terminal on the channel resource of the first TRP; or after a random access process is completed, sending the update indication to the terminal on the channel resource of the first TRP.

In some examples, the during the random access process, sending the update indication to the terminal on the channel resource of the first TRP includes the following sub-step:

during a four-step random access process, sending a Msg4 carrying the update indication; or during a four-step random access process, sending a Msg4, the Msg4 being the update indication; or during a two-step random access process, sending a MsgB carrying the update indication.

In some examples, the after the random access process is completed, sending the update indication to the terminal on the channel resource of the first TRP includes the following sub-step:

sending a control resource set pool index configuration signaling or a control resource set configuration signaling carrying the update indication, the control resource set pool index configuration signaling or the control resource set configuration signaling being carried in at least one of a RRC signaling, a MAC CE signaling and a DCI signaling.

In some examples, the update indication is used to indicate the terminal to update the control resource set pool index corresponding to a CORESET other than CORESET #0 on the first TRP.

In some examples, the update indication includes the control resource set pool index of the control resource set of the first TRP; or the update indication includes an empty field, the empty field being used to indicate the control resource set pool index of the control resource set corresponding to the first TRP being a default index value.

It is worth noting that the above steps 201 to 202 and the above alternative steps may be combined in any combination.

Figure 4:
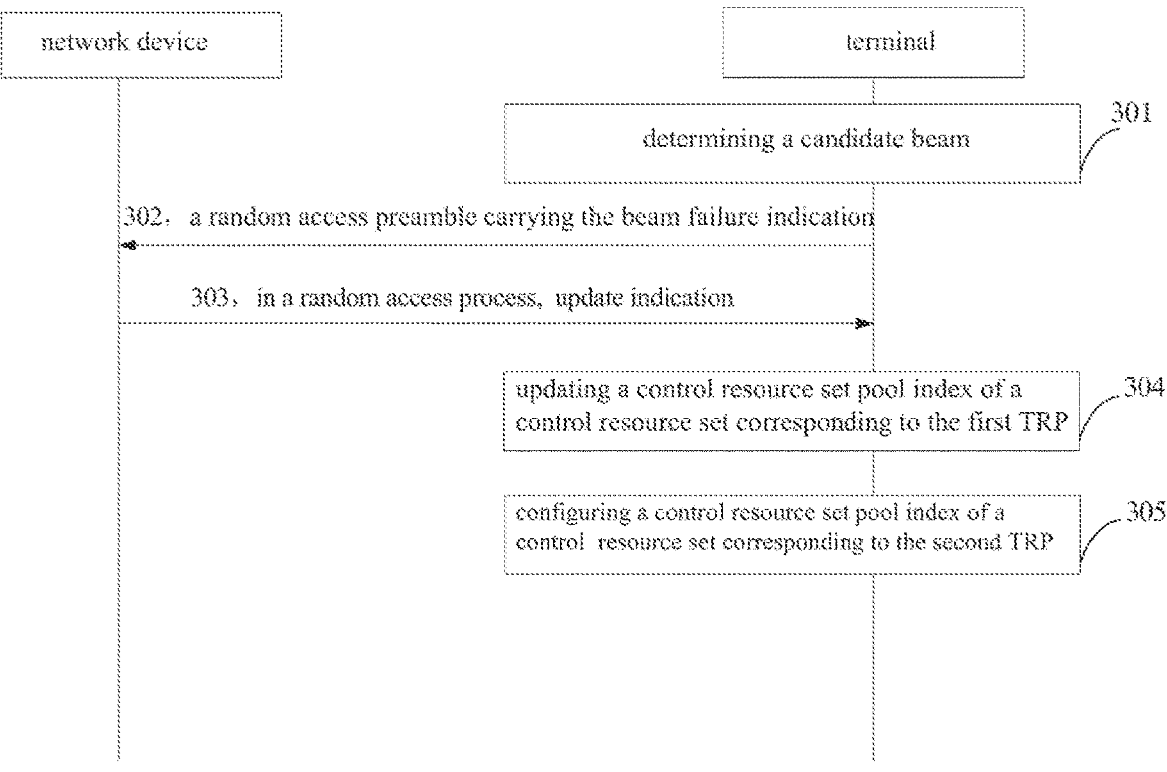
FIG. 4 is a flowchart of a control resource set pool index updating method illustrated according to an embodiment.

FIG. 4 is a flowchart of a control resource set pool index updating method illustrated according to an embodiment. Referring to FIG. 4 the method includes the following steps of 301 to 305.

In the step 301, when a beam failure occurs at a second TRP, a terminal determines a candidate beam, the candidate beam being on the first TRP.

In this embodiment, the candidate beam is used for random access to realize beam recovery.

For example, the terminal may determine that a beam failure occurs at the second TRP based on a reference signal in q0.

In the step 302, the terminal sends, by using a random access channel corresponding to a candidate beam, a random access preamble carrying the beam failure indication, and the network device receives the random access preamble carrying the beam failure indication.

In the embodiments of the present disclosure, the beam failure indication may only indicate the existence of a TRP at which a beam failure occurs, but do not indicate which TRP or TRPs the beam failure occurs at, that is, when the network device receives the beam failure indication, it does not know which TRP or TRPs the beam failure occurs at, i.e., it does not know the identification information of the TRP at which the beam failure occurs.

In one case, the network device sends the update indication without knowing the identification information of the TRP at which the beam failure occurs. In another case, after sending the beam failure indication, the terminal further sends a message to inform the network device of the identification information of the TRP at which the beam failure occurs, causing the network device to send the update indication in the case of knowing the identification information of the TRP at which the beam failure occurs. In still another case, after sending the beam failure indication, the terminal further sends a message to inform the network device of the identification information of the TRP at which the beam failure occurs and the identification information of the candidate beam, causing the network device to send the update indication in the case of knowing the identification information of the TRP at which the beam failure occurs and the identification information of the candidate beam.

In some examples, the method further includes the following steps:

the terminal sends, during a four-step random access process, a Msg3 carrying identification information of the second TRP, and the network device receives the Msg3 carrying the identification information of the second TRP; or, the terminal sends, during a two-step random access process, a MsgA carrying identification information of the second TRP, and the network device receives the MsgA carrying the identification information of the second TRP.

In the step 303, in a random access process, the network device sends an update indication to the terminal on a channel resource of the first TRP, and the terminal receives the update indication.

For example, the step 303 may includes the following sub-steps:

during a four-step random access process, the network device sends a Msg4 carrying the update indication, and the terminal receives the Msg4 carrying the update indication; or during a four-step random access process, the network device sends a Msg4, and the terminal receives the Msg4, the Msg4 being the update indication; or during a two-step random access process, the network device sends a MsgB carrying the update indication, and the terminal receives the MsgB carrying the update indication.

In the step 304, the terminal updates, in response to the update indication, a control resource set pool index of a control resource set corresponding to the first TRP.

In the embodiments of the present disclosure, the update indication may be a field carried in the message during a random access process, or may be the message itself during a random access process. In both cases, the terminal performs different actions after receiving the update indication.

For example, the update indication is written in a Msg4 or MsgB. The step 304 may includes the following sub-steps:

the terminal determines, based on the update indication, the control resource set pool index of the control resource set corresponding to the first TRP; and the terminal updates the control resource set pool index of the control resource set corresponding to the first TRP.

In this case, the update needs to determine how to update the CORESETPoolindex based on the content of the update indication.

For example, the update indication includes the control resource set pool index of the control resource set of the first TRP. In this case, the terminal updates the CORESETpoolindex of each CORESET of the first TRP according to the control resource set pool index of the control resource set indicated in the update indication. For example, the update indication includes the identification of the control resource set of the first TRP and the corresponding control resource set pool index.

Alternatively, the update indication includes an empty field, the empty field being used to indicate the control resource set pool index of the control resource set corresponding to the first TRP being a default index value. In this case, the terminal updates the CORESETpoolindex of each CORESET of the first TRP to the default index value, such as 0.

For another example, the update indication is a Msg4. The step 304 may includes the following sub-steps:

after a predetermined time starting from receiving of the update indication, the terminal updates the control resource set pool index of the control resource set corresponding to the first TRP to a default index value.

In the step 305, the terminal configures a control resource set pool index of a control resource set corresponding to the second TRP.

For example, update the control resource set pool index of the control resource set corresponding to the second TRP to a different value from the control resource set pool index of the control resource set corresponding to the first TRP, such as 1.

Figure 5:
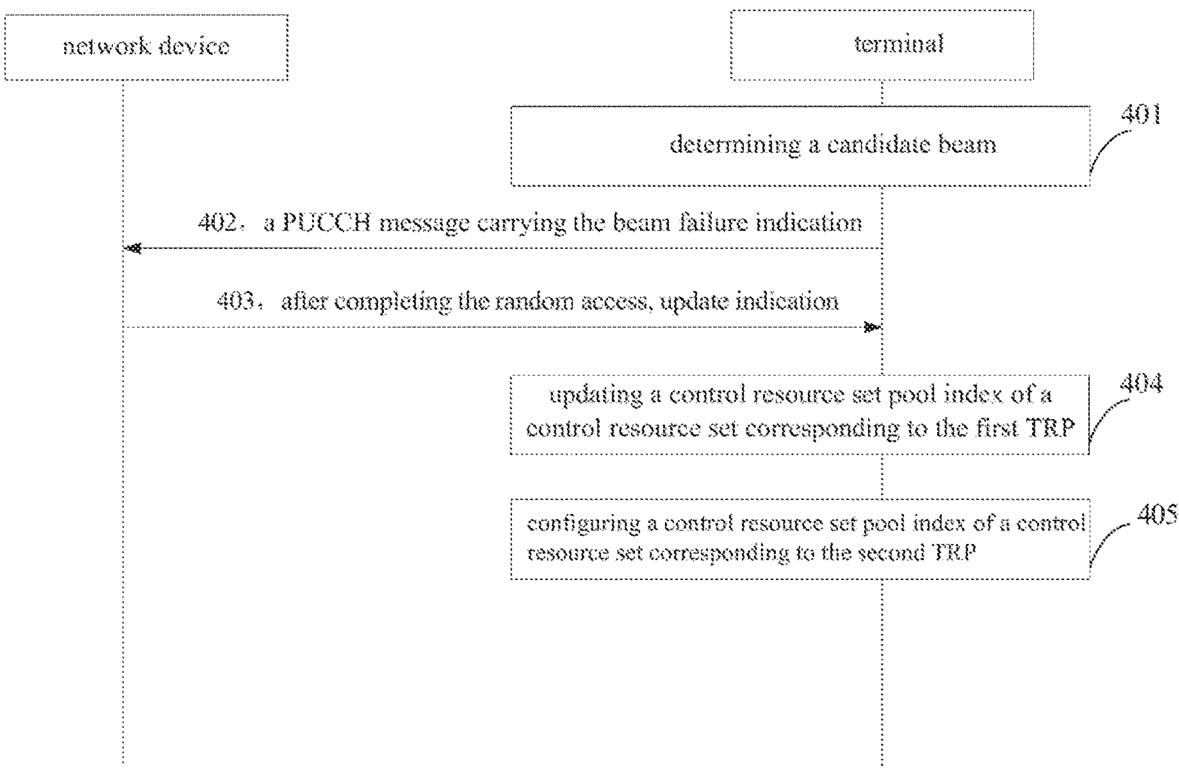
FIG. 5 is a flowchart of a control resource set pool index updating method illustrated according to an embodiment.

FIG. 5 is a flowchart of a control resource set pool index updating method illustrated according to an embodiment. Referring to FIG. 5, the method includes the following steps of 401 to 405.

In the step 401, when a beam failure occurs at a second TRP, a terminal determines a candidate beam, the candidate beam being on the first TRP.

In this embodiment, the candidate beam is used for random access to realize beam recovery.

For example, the terminal may determine that a beam failure occurs at the second TRP based on a reference signal in q0.

In the step 402, the terminal sends a PUCCH message carrying the beam failure indication. The network device receives the PUCCH message carrying the beam failure indication.

For example, the sending the PUCCH message carrying the beam failure indication includes the following sub-step:

sending, by using a scheduling request (SR), the beam failure indication on a PUCCH resource.

In the embodiments of the present disclosure, the beam failure indication may only indicate the existence of a TRP at which a beam failure occurs, but do not indicate which TRP or TRPs the beam failure occurs at, that is, when the network device receives the beam failure indication, it does not know which TRP or TRPs the beam failure occurs at, i.e., it does not know the identification information of the TRP at which the beam failure occurs.

In one case, the network device sends the update indication without knowing the identification information of the TRP at which the beam failure occurs. In another case, after sending the beam failure indication, the terminal further sends a message to inform the network device of the identification information of the TRP at which the beam failure occurs, causing the network device to send the update indication in the case of knowing the identification information of the TRP at which the beam failure occurs. In still another case, after sending the beam failure indication, the terminal further sends a message to inform the network device of the identification information of the TRP at which the beam failure occurs and the identification information of the candidate beam, causing the network device to send the update indication in the case of knowing the identification information of the TRP at which the beam failure occurs and the identification information of the candidate beam.

In some examples, the method further includes the following steps:

the terminal sends, on a PUSCH resource, identification information of the second TRP and/or identification information of a reference signal corresponding to the candidate beam, and the network device receives the identification information of the second TRP and/or the identification information of the reference signal corresponding to the candidate beam, the PUSCH resource being a PUSCH resource indicated by resource scheduling information sent by the network device based on the SR.

After receiving the scheduling request SR from the terminal, the network device sends an UL grant to the terminal and assigns a PUSCH to the terminal. After receiving the UL grant, the terminal uses the PUSCH described above to send the identification information of the second TRP and/or the identification information of the reference signal corresponding to the candidate beam.

When the message during a random access is used for transmission of beam failure indication and subsequent identification information, the network device knows, based on the beam used for transmission of the random access preamble, the candidate beam determined by the terminal. In contrast, when PUCCH and PUSCH are used to send beam failure indication and subsequent identification information, the network device does not know the candidate beam, so there is a need to send the identification information of the reference signal corresponding to the candidate beam, thus informing the network device of the candidate beam.

In the step 403, after completing the random access, the network device sends an update indication. The terminal receives the update indication.

For example, the step 403 includes the following sub-steps:

the network device sends a control resource set pool index configuration signaling or a control resource set configuration signaling carrying the update indication, and the terminal receives the control resource set pool index configuration signaling or the control resource set configuration signaling carrying the update indication, the control resource set pool index configuration signaling or the control resource set configuration signaling being carried in at least one of a RRC signaling, a MAC CE signaling and a DCI signaling.

In the step 404, the terminal, in response to the update indication, updates a control resource set pool index of a control resource set corresponding to the first TRP.

For the implementation method of the step 404, please refer to the step 304 and will not be repeated here.

In the step 405, the terminal configures a control resource set pool index of a control resource set corresponding to the second TRP.

For the implementation method of the step 405, please refer to the step 305 and will not be repeated here.

Figure 6:
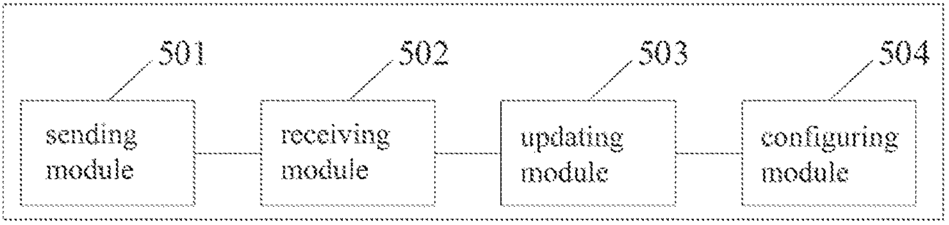
FIG. 6 is a schematic structure diagram of a control resource set pool index updating apparatus illustrated according to an embodiment.

FIG. 6 is a schematic structure diagram of a control resource set pool index updating apparatus illustrated according to an embodiment. The apparatus has a function to implement the terminal of the method embodiments described above. The function may be implemented by hardware or by executing corresponding software through hardware. As shown in FIG. 6, the apparatus includes a sending module 501, a receiving module 502 and an updating module 503.

In this embodiment, the sending module 501 is configured to send a beam failure indication to a network device on a channel resource of a first TRP, the beam failure indication being used to inform the network device of a beam failure occurred at a second TRP, the second TRP being a default TRP before the beam failure occurs, and the first TRP and the second TRP belonging to a same physical cell; the receiving module 502 is configured to receive an update indication sent by the network device on the channel resource of the first TRP based on the beam failure indication; and the updating module 503 is configured to in response to the update indication, update a control resource set pool index of a control resource set corresponding to the first TRP.

In some examples, the sending module 501 is specifically configured to send, during a four-step random access process, a Msg3 carrying identification information of the second TRP; or, send, during a two-step random access process, a MsgA carrying identification information of the second TRP.

In some examples, the sending module 501 is specifically configured to, after the sending, by using the random access channel corresponding to the candidate beam, the random access preamble carrying the beam failure indication, send, during a four-step random access process, a Msg3 carrying identification information of the second TRP; or, send, during a two-step random access process, a MsgA carrying identification information of the second TRP.

In some examples, the sending module 501 is configured to send, by using a scheduling request SR, the beam failure indication on a PUCCH resource.

In some examples, the sending module 501 is specifically configured to, after the sending the PUCCH message carrying the beam failure indication, send, on a PUSCH resource, identification information of the second TRP and/or identification information of a reference signal corresponding to the candidate beam, the PUSCH resource being a PUSCH resource indicated by resource scheduling information sent by the network device based on the SR.

In some examples, the receiving module 502 is configured to receive the update indication sent by the network device on the channel resource of the first TRP during a random access process; or receive the update indication sent by the network device on the channel resource of the first TRP after a random access process is completed.

In some examples, the receiving module 502 is configured to, during a four-step random access process, receive a Msg4 carrying the update indication; or during a four-step random access process, receive a Msg4, the Msg4 being the update indication; or during a two-step random access process, receive a MsgB carrying the update indication.

In some examples, the receiving module 502 is configured to receive a control resource set pool index configuration signaling or a control resource set configuration signaling carrying the update indication, the control resource set pool index configuration signaling or the control resource set configuration signaling being carried in at least one of a RRC signaling, a MAC CE signaling and a DCI signaling.

In some examples, the update indication is used to indicate a terminal to update the control resource set pool index corresponding to a CORESET other than CORESET #0 on the first TRP.

In some examples, the update indication includes the control resource set pool index of the control resource set of the first TRP; or the update indication includes an empty field, the empty field being used to indicate the control resource set pool index of the control resource set corresponding to the first TRP being a default index value.

In some examples, the updating module 503 is configured to determine, based on the update indication, the control resource set pool index of the control resource set corresponding to the first TRP; and update the control resource set pool index of the control resource set corresponding to the first TRP; or after a predetermined time starting from receiving of the update indication, update the control resource set pool index of the control resource set corresponding to the first TRP to a default index value.

In some examples, the apparatus further includes a configuring module 504, configured to configure a control resource set pool index of a control resource set corresponding to the second TRP.

In some examples, the default TRP is a TRP corresponding to a control resource set pool index of CORESET #0 of a terminal.

Figure 7:
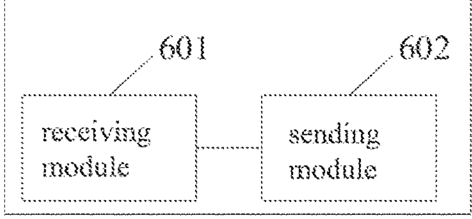
FIG. 7 is a schematic structure diagram of a control resource set pool index updating apparatus illustrated according to an embodiment.

FIG. 7 is a schematic structure diagram of a control resource set pool index updating apparatus illustrated according to an embodiment. The apparatus has a function to implement the network device of the method embodiments described above. The function may be implemented by hardware or by executing corresponding software through hardware. As shown in FIG. 7, the apparatus includes a receiving module 601 and a sending module 602.

In this embodiment, the receiving module 601 is configured to receive a beam failure indication sent by a terminal to a network device on a channel resource of a first TRP, the beam failure indication being used to inform the network device of a beam failure occurred at a second TRP, the second TRP being a default TRP before the beam failure occurs, and the first TRP and the second TRP belonging to a same physical cell; and the sending module 602 is configured to in response to the beam failure indication, send an update indication to the terminal on the channel resource of the first TRP, the update indication being used to indicate the terminal to update a control resource set pool index of a control resource set corresponding to the first TRP.

In some examples, the receiving module 601 is configured to receive a random access preamble carrying the beam failure indication sent by the terminal by using a random access channel corresponding to a candidate beam; or receive a PUCCH message carrying the beam failure indication and sent by the terminal.

In some examples, the receiving module 601 is specifically configured to after the receiving the random access preamble carrying the beam failure indication sent by the terminal by using the random access channel corresponding to the candidate beam, receive, during a four-step random access process, a Msg3 carrying identification information of the second TRP; or, receive, during a two-step random access process, a MsgA carrying identification information of the second TRP.

In some examples, the receiving module 601 is configured to receive the beam failure indication sent by the terminal on a PUCCH resource using a scheduling request SR.

In some examples, the receiving module 601 is configured to after the receiving the PUCCH message carrying the beam failure indication and sent by the terminal, receive identification information of the second TRP and/or identification information of a reference signal corresponding to the candidate beam sent by the terminal on a PUSCH resource, the PUSCH resource being a PUSCH resource indicated by resource scheduling information sent by the network device based on the SR.

In some examples, the sending module 602 is configured to during a random access process, send the update indication to the terminal on the channel resource of the first TRP; or after a random access process is completed, send the update indication to the terminal on the channel resource of the first TRP.

In some examples, the sending module 602 is configured to during a four-step random access process, send a Msg4 carrying the update indication; or during a four-step random access process, send a Msg4, the Msg4 being the update indication; or during a two-step random access process, send a MsgB carrying the update indication.

In some examples, the sending module 602 is configured to send a control resource set pool index configuration signaling or a control resource set configuration signaling carrying the update indication, the control resource set pool index configuration signaling or the control resource set configuration signaling being carried in at least one of a RRC signaling, a MAC CE signaling and a DCI signaling.

In some examples, the update indication is used to indicate the terminal to update the control resource set pool index corresponding to a CORESET other than CORESET #0 on the first TRP.

In some examples, the update indication includes the control resource set pool index of the control resource set of the first TRP; or the update indication includes an empty field, the empty field being used to indicate the control resource set pool index of the control resource set corresponding to the first TRP being a default index value.

Figures 8, 9:
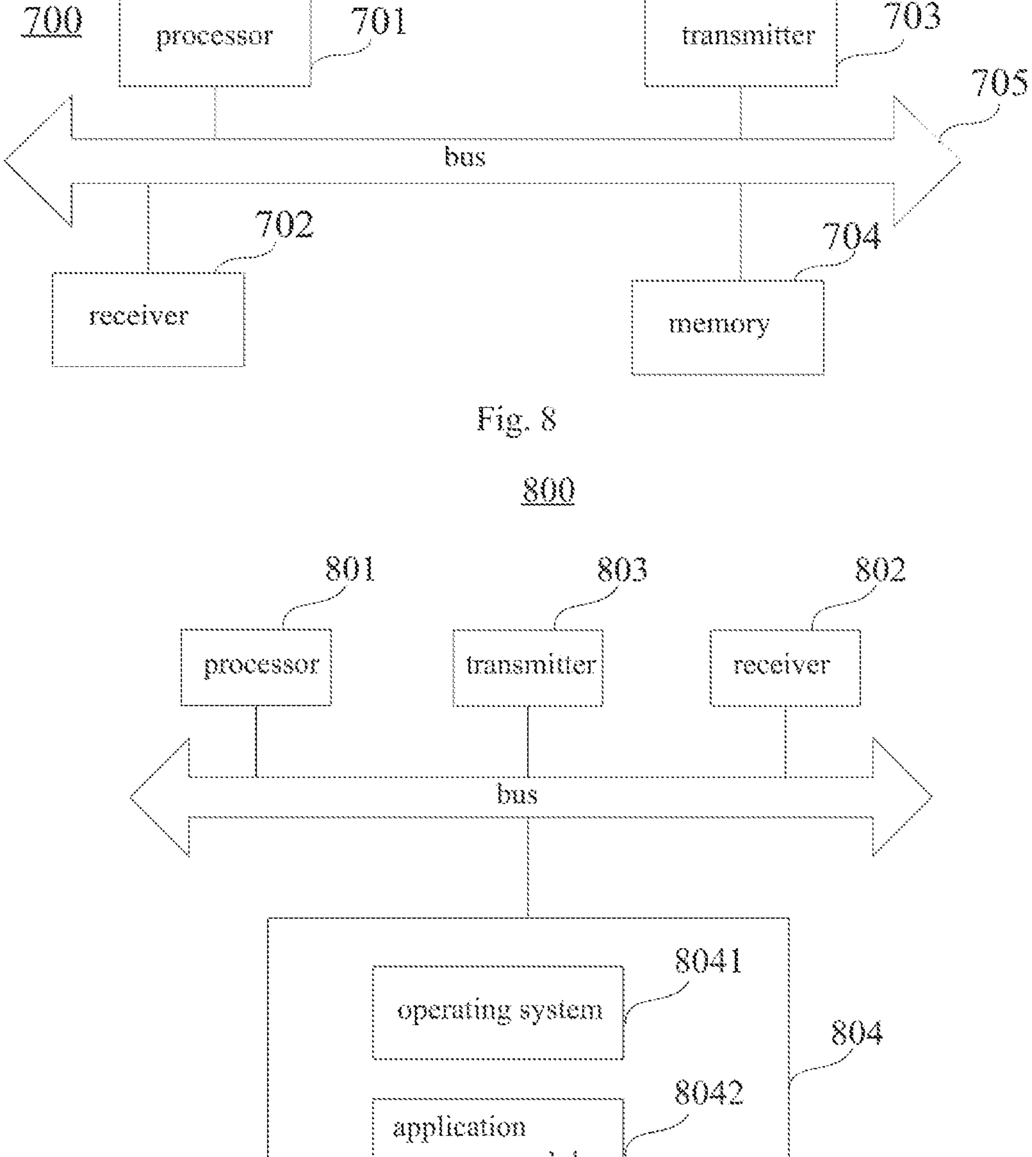
FIG. 8 is a block diagram of a terminal illustrated according to an embodiment.
FIG. 9 is a block diagram of a network device illustrated according to an embodiment.

FIG. 8 is a block diagram of a terminal 700 illustrated according to an embodiment. The terminal 700 includes a processor 701, a receiver 702, a transmitter 703, a memory 704 and a bus 705.

The processor 701 includes one or more processing cores, and the processor 701 executes various functional applications as well as information processing by running software programs as well as modules.

The receiver 702 and the transmitter 703 may be implemented as a communication component. The communication component may be a communication chip.

The memory 704 is connected to the processor 701 via the bus 705.

The memory 704 may be configured to store at least one instruction. The processor 701 is configured to execute the at least one instruction to implement various steps in the method embodiments described above.

In addition, the memory 704 may be implemented by any type of volatile or non-volatile storage device or a combination of any type of volatile and non-volatile storage device, the volatile or non-volatile storage devices including, but not limited to the following: a disk or optical disk, electrically erasable programmable read-only memory (EEPROM), erasable programmable read-only memory (EPROM), static readily accessible memory (SRAM), read-only memory (ROM), magnetic memory, flash memory, programmable read-only memory (PROM).

In one embodiment, a computer-readable storage medium is also provided. The computer-readable storage medium stores at least one instruction, at least one program, code set or instruction set. The at least one instruction, at least one program, code set or instruction set is loaded and executed by the processor to implement the control resource set pool index updating method provided by the above various method embodiments.

FIG. 9 is a block diagram of a network device 800 illustrated according to an embodiment. The network device 800 may include a processor 801, a receiver 802, a transmitter 803 and a memory 804. The receiver 802, the transmitter 803, and the memory 804 are each connected to the processor 801 via a bus.

The processor 801 includes one or more processing cores, and the processor 801 executes, by running software programs as well as modules, the method performed by the network device and in the control resource set pool index updating method provided by the embodiments of the present disclosure. The memory 804 may be used to store software programs as well as modules. Specifically, the memory 804 may store operating system 8041, and application program modules 8042 required for at least one function. The receiver 802 is used to receive communication data sent by other devices, and the transmitter 803 is used to send the communication data to other devices.

In one embodiment, a computer-readable storage medium is also provided. The computer-readable storage medium stores at least one instruction, at least one program, code set or instruction set. The at least one instruction, at least one program, code set or instruction set is loaded and executed by the processor to implement the control resource set pool index updating method provided by the above various method embodiments.

One embodiment of the present disclosure also provides a control resource set pool index updating system, the control resource set pool index updating system includes a terminal and a network device. The terminal is a terminal as provided in the embodiment shown in FIG. 8. The network device is a network device as provided in the embodiment shown in FIG. 9.

One embodiment of the present disclosure provides a control resource set pool index updating apparatus, and the apparatus includes:

a transmitter, configured to send a beam failure indication to a network device on a channel resource of a first TRP, the beam failure indication being used to inform the network device of a beam failure occurred at a second TRP, the second TRP being a default TRP before the beam failure occurs, and the first TRP and the second TRP belonging to a same physical cell;

a receiver, configured to receive an update indication sent by the network device on the channel resource of the first TRP based on the beam failure indication;

an updating module, configured to in response to the update indication, update a control resource set pool index of a control resource set corresponding to the first TRP.

One embodiment of the present disclosure provides a control resource set pool index updating apparatus, and the apparatus includes:

a receiver, configured to receive a beam failure indication sent by a terminal to a network device on a channel resource of a first TRP, the beam failure indication being used to inform the network device of a beam failure occurred at a second TRP, the second TRP being a default TRP before the beam failure occurs, and the first TRP and the second TRP belonging to a same physical cell; and a transmitter, configured to in response to the beam failure indication, send an update indication to the terminal on the channel resource of the first TRP, the update indication being used to indicate the terminal to update a control resource set pool index of a control resource set corresponding to the first TRP.

Those skilled in the art will easily think of other embodiments of the present disclosure after considering the description and practicing the present disclosure. The present disclosure is intended to cover any variant, use or adaptive change of the present disclosure. These variants, uses or adaptive changes follow the general principles of the present disclosure and include the common knowledge or commonly used technical means in the technical field not disclosed in the present disclosure. The description and the embodiments are only regarded as illustrative. The true scope and spirit of the present disclosure are indicated by the following claims.

It should be understood that the present disclosure is not limited to the precise structure described above and shown in the drawings, and various modifications and changes can be made without departing from the scope of the present disclosure. The scope of the present disclosure is limited only by the appended claims.

What is claimed is:

1. A method for updating control resource set pool index, performed by a terminal, comprising:

sending a beam failure indication to a network device on a channel resource of a first transmission reception point (TRP), the beam failure indication being used to inform the network device of a beam failure occurred at a second TRP, the second TRP being a default TRP before the beam failure occurs, and the first TRP and the second TRP belonging to a same physical cell;

receiving an update indication sent by the network device on the channel resource of the first TRP based on the beam failure indication, wherein the update indication is used for indicating the terminal to update a control resource set pool index (CORESETpoolindex) corresponding to a control resource set (CORESET) other than CORESET #0 on the first TRP; and in response to receiving the update indication, updating the CORESETpoolindex of the CORESET corresponding to the first TRP;

wherein the update indication comprises the control resource set pool index of the CORESET of the first TRP; or the update indication comprises an empty field, the empty field being used to indicate the control resource set pool index of the CORESET corresponding to the first TRP being a default index value;

wherein in response to receiving the update indication, updating the control resource set pool index of the CORESET corresponding to the first TRP comprises:

after a predetermined time starting from receiving of the update indication, updating the control resource set pool index of the CORESET corresponding to the first TRP to the default index value.

2. The method according to claim 1, wherein the sending the beam failure indication to the network device on the channel resource of the first TRP comprises:

sending, by using a random access channel corresponding to a candidate beam, a random access preamble carrying the beam failure indication; or sending a PUCCH message carrying the beam failure indication.

3. The method according to claim 2, after the sending, by using the random access channel corresponding to the candidate beam, the random access preamble carrying the beam failure indication, the method further comprises:

sending, during a four-step random access process, a Msg3 carrying identification information of the second TRP; or, sending, during a two-step random access process, a MsgA carrying identification information of the second TRP.

4. The method according to claim 2, wherein the sending the PUCCH message carrying the beam failure indication comprises:

sending the beam failure indication by using a scheduling request SR on a PUCCH resource.

5. The method according to claim 4, after the sending the PUCCH message carrying the beam failure indication, the method further comprises at least one of:

sending identification information of the second TRP on a PUSCH resource; or sending identification information of a reference signal corresponding to the candidate beam on a PUSCH resource;

wherein the PUSCH resource being a PUSCH resource indicated by resource scheduling information sent by the network device based on the SR.

6. The method according to claim 1, wherein the receiving the update indication sent by the network device on the channel resource of the first TRP based on the beam failure indication comprises:

receiving the update indication sent by the network device on the channel resource of the first TRP during a random access process; or receiving the update indication sent by the network device on the channel resource of the first TRP after a random access process is completed.

7. The method according to claim 6, wherein the receiving the update indication sent by the network device on the channel resource of the first TRP during the random access process comprises:

during a four-step random access process, receiving a Msg4, the Msg4 carrying the update indication or being the update indication; or during a two-step random access process, receiving a MsgB, the MsgB carrying the update indication;

wherein the receiving the update indication sent by the network device on the channel resource of the first TRP after the random access process is completed comprises:

receiving a control resource set pool index configuration signaling or a control resource set configuration signaling carrying the update indication, the control resource set pool index configuration signaling or the control resource set configuration signaling being carried in at least one of a RRC signaling, a MAC CE signaling and a DCI signaling.

8. The method according to claim 1, further comprising:

updating a control resource set pool index of a control resource set corresponding to the second TRP.

9. The method according to claim 1, wherein the default TRP is a TRP corresponding to a control resource set pool index of CORESET #0 of the terminal.

10. A method for updating control resource set pool index, performed by a network device, comprising:

receiving a beam failure indication sent by a terminal to the network device on a channel resource of a first transmission reception point (TRP), the beam failure indication being used to inform the network device of a beam failure occurred at a second TRP, the second TRP being a default TRP before the beam failure occurs, and the first TRP and the second TRP belonging to a same physical cell; and in response to receiving the beam failure indication, sending an update indication to the terminal on the channel resource of the first TRP, thereby enabling the terminal to, in response to receiving the update indication, update a control resource set pool index (CORESETpoolindex) corresponding to a CORESET other than CORESET #0 on the first TRP, wherein the update indication comprises the control resource set pool index of the CORESET of the first TRP; or the update indication comprises an empty field, the empty field being used to indicate the control resource set pool index of the CORESET corresponding to the first TRP being a default index value;

wherein in response to receiving the update indication, updating the control resource set pool index of the CORESET corresponding to the first TRP comprises:

after a predetermined time starting from receiving of the update indication, updating the control resource set pool index of the CORESET corresponding to the first TRP to the default index value.

11. The method according to claim 10, wherein the receiving the beam failure indication sent by the terminal to the first TRP comprises:

receiving a random access preamble carrying the beam failure indication sent by the terminal by using a random access channel corresponding to a candidate beam; or receiving a PUCCH message carrying the beam failure indication and sent by the terminal.

12. The method according to claim 11, after the receiving the random access preamble carrying the beam failure indication sent by the terminal by using the random access channel corresponding to the candidate beam, the method further comprises:

receiving, during a four-step random access process, a Msg3 carrying identification information of the second TRP; or, receiving, during a two-step random access process, a MsgA carrying identification information of the second TRP.

13. The method according to claim 11, wherein the receiving the PUCCH message carrying the beam failure indication and sent by the terminal comprises:

receiving the beam failure indication sent by the terminal on a PUCCH resource using a scheduling request SR.

14. The method according to claim 13, after the receiving the PUCCH message carrying the beam failure indication and sent by the terminal, the method further comprises at least one of:

receiving identification information of the second TRP sent by the terminal on a PUSCH resource; or receiving identification information of a reference signal corresponding to the candidate beam sent by the terminal on a PUSCH resource;

wherein the PUSCH resource being PUSCH resource indicated by resource scheduling information sent by the network device based on the SR.

15. The method according to claim 10, wherein the sending the update indication to the terminal on the channel resource of the first TRP comprises:

during a random access process, sending the update indication to the terminal on the channel resource of the first TRP; or after a random access process is completed, sending the update indication to the terminal on the channel resource of the first TRP.

16. A terminal, comprising:

at least one processor; and at least one memory, configured to store executable instructions executable by the at least one processor;

wherein the at least one processor, through loading and executing the executable instructions, is configured to:

send a beam failure indication to a network device on a channel resource of a first TRP, the beam failure indication being used to inform the network device of a beam failure occurred at a second TRP, the second TRP being a default TRP before the beam failure occurs, and the first TRP and the second TRP belonging to a same physical cell;

receive an update indication sent by the network device on the channel resource of the first TRP based on the beam failure indication, wherein the update indication is used for indicating the terminal to update a control resource set pool index (CORESETpoolindex) corresponding to a control resource set (CORESET) other than CORESET #0 on the first TRP; and in response to the update indication, update the CORESETpoolindex of the CORESET corresponding to the first TRP;

wherein the update indication comprises the control resource set pool index of the CORESET of the first TRP; or the update indication comprises an empty field, the empty field being used to indicate the control resource set pool index of the CORESET corresponding to the first TRP being a default index value;

wherein the processor is further configured to:

after a predetermined time starting from receiving of the update indication, update the control resource set pool index of the CORESET corresponding to the first TRP to the default index value.

17. A network device, comprising:

at least one processor; and at least one memory, configured to store executable instructions executable by the at least one processor;

wherein the at least one processor is configured to load and execute the executable instructions to implement the control resource set pool index updating method of claim 10.

* * * * *